(12) United States Patent
Muranaka et al.

(10) Patent No.: US 7,354,808 B2
(45) Date of Patent: Apr. 8, 2008

(54) RESIST COMPOSITION AND METHOD FOR MANUFACTURING SEMICONDUCTOR DEVICE USING THE SAME

(75) Inventors: Koji Muranaka, Atsugi (JP); Ryoji Nomura, Yamato (JP); Keitaro Imai, Yokohama (JP); Shinji Maekawa, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/915,428

(22) Filed: Aug. 11, 2004

(65) Prior Publication Data

US 2005/0048289 A1 Mar. 3, 2005

(30) Foreign Application Priority Data

Aug. 15, 2003 (JP) ............................. 2003-293660

(51) Int. Cl.
*H01L 21/00* (2006.01)
(52) U.S. Cl. ............... 438/151; 438/942; 257/E21.023; 430/270.1
(58) Field of Classification Search ................ 438/151, 438/942; 257/E21.023; 430/270.1
See application file for complete search history.

(56) References Cited

U.S. PATENT DOCUMENTS

| | | | |
|---|---|---|---|
| 3,079,569 A | | 2/1963 | Loach, Jr. |
| 5,132,248 A | | 7/1992 | Drummond et al. |
| 5,607,999 A | | 3/1997 | Shimizu et al. |
| 5,629,132 A | * | 5/1997 | Suzuki et al. ............. 430/258 |
| 5,981,146 A | * | 11/1999 | Kumada et al. .......... 430/273.1 |
| 6,187,380 B1 | * | 2/2001 | Hallman et al. ............ 427/261 |
| 6,303,277 B1 | * | 10/2001 | Hieda et al. ................ 430/322 |
| 6,514,801 B1 | | 2/2003 | Yudasaka et al. |
| 6,548,331 B2 | * | 4/2003 | Lee et al. .................... 438/149 |
| 6,682,773 B2 | * | 1/2004 | Medwick et al. ........... 427/154 |
| 6,713,389 B2 | | 3/2004 | Speakman |
| 6,849,328 B1 | * | 2/2005 | Medwick et al. ........... 428/341 |
| 7,061,570 B2 | | 6/2006 | Imai |
| 7,232,773 B2 | | 6/2007 | Imai et al. |
| 2002/0113248 A1 | | 8/2002 | Yamagata et al. |
| 2002/0176988 A1 | * | 11/2002 | Medwick et al. ........... 428/408 |
| 2003/0059987 A1 | | 3/2003 | Sirringhaus et al. |
| 2004/0147066 A1 | | 7/2004 | Yamazaki et al. |
| 2004/0147067 A1 | | 7/2004 | Ushitani et al. |
| 2004/0147113 A1 | | 7/2004 | Yamazaki et al. |
| 2004/0253835 A1 | | 12/2004 | Kawase |

FOREIGN PATENT DOCUMENTS

| | | |
|---|---|---|
| JP | 05-338187 | 12/1993 |
| JP | 06-237063 | 8/1994 |
| JP | 07-134398 | 5/1995 |
| JP | 08-288623 | 11/1996 |
| JP | 10-039127 | 2/1998 |
| JP | 2002-324966 | 11/2002 |

\* cited by examiner

*Primary Examiner*—Michael Lebentritt
*Assistant Examiner*—Stanetta Isaac
(74) *Attorney, Agent, or Firm*—Eric J. Robinson; Robinson Intellectual Property Law Office, P.C.

(57) ABSTRACT

An object of the invention is to provide a resist composition which is possible to form a film by using a drawing means and which functions as a protective film used at the time of etching, adding impurities, or the like. In addition, an object is also to provide a manufacturing step of a semiconductor device in which a substance with high safety and that is easily treated can be used as a peeling solution, and which pays attention to an environment. A resist composition of the invention contains water-soluble homopolymer, water, or a solvent that has compatibility with water and can dissolve the water-soluble homopolymer. In addition, a method for manufacturing the semiconductor device of the invention has a step of removing the protective film formed by discharging the resist composition of the invention by using a drawing means with water after using it.

30 Claims, 7 Drawing Sheets

[RESIST COMPOSITION AND METHOD FOR MANUFACTURING SEMICONDUCTOR DEVICE USING THE SAME]

BACKGROUND OF THE INVENTION

1. Field of the Invention

The present invention relates to a resist composition and more specifically to a resist composition suitable for forming a film by using an ink-jet device.

2. Description of the Related Art

A device (an ink-jet device) using a droplet discharge means that discharges a droplet such as ink from a small nozzle is generally used as a printer or a recorder.

In addition, in a manufacturing step of a printed-circuit board, an ink-jet device is used as a means for forming a protective resist (for example, Reference 1: Japanese Patent Laid-Open No. H8-288623). Furthermore, in recent years, an ink-jet device is used also as a means for forming a light-emitting layer of an electroluminescent element.

Thus, an ink-jet device is used not only as a printer or a recorder but also as a manufacturing apparatus of a semiconductor device or a display device, and it is a device of which usage is expected to be enlarged much more in future.

As the usage of the device expands, a material having a performance applicable to each usage also needs to be developed.

However, the resist, that is formed in a film so far, mainly with an application method, and a resist composed of various components/compositions has been developed to have a performance corresponding to the usage such as a color filter, a lead frame, or a shadow mask formation (for example, Reference 2: Japanese Patent Laid-Open No. H10-39127 and Reference 3: Japanese Patent Laid-Open No. H7-134398).

Not only the resist used in a manufacturing step of the printed-circuit board as mentioned above but also a resist formed in a film by using an ink-jet device is need to be developed to have a performance corresponding to other various usages.

Of course, it is important to develop a material with high performance; however, it is also an important object in developing a material to develop a material with high safety so as not to use a hazardous material as much as possible and to pay attention to an environment.

Reference 1: Japanese Patent Laid-Open No. H8-288623
Reference 2: Japanese Patent Laid-Open No. H10-39127
Reference 3: Japanese Patent Laid-Open No. H7-134398

SUMMARY OF THE INVENTION

In the present invention, an object is to provide a resist composition that can formed as a film by using a drawing means and that functions as a protective film used at the time of etching, adding impurities, or the like. In addition, an object is also to provide a manufacturing step of a semiconductor device in which a substance with high safety and that is easily treated can be used as a peeling solution, and which pays attention to an environment.

According to one aspect of the invention, a resist composition contains water-soluble homopolymer, water, or a solvent that has compatibility with water and can dissolve the water-soluble homopolymer.

Polyvinyl alcohol is preferable as the water-soluble homopolymer. However, it is not limited thereto and other water-soluble homopolymer may be used.

As the solvent, there are N,N-dimethylformamide (DMF), dimethyl sulfoxide (DMSO), glycerol, hexamethylphosphorous triamide (HMPT), hexamethyl phosphoramide (HMPA), piperazine, triethylenediamine, and the like. In addition, a mixed solvent containing at least two substances selected from water, DMF, DMSO, glycerol, HMPT, HMPA, piperazine, and triethylenediamine can be used also as the solvent.

Note that polyvinyl alcohol is soluble in water and a solvent containing one or more than two kinds of a substance selected from the above solvents.

According to another aspect of the invention, a resist composition contains polyvinyl alcohol and water.

Polyvinyl alcohol is a substance suitable for a protective film during dry etching in a manufacturing step of a semiconductor device. In addition, water can be easily obtained and is a substance with high chemical stability without toxicity; therefore, it is preferable to use for the solvent.

The resist composition of the invention described above does not need to use a photolithography step and is suitable for a material for forming a film by a drawing means that is capable of pattern formation. Here, as the drawing means, there is a device that is capable of forming a pattern by controlling timing and position for supplying liquid, for example, a device equipped with a droplet discharge means and a position control means such as an ink-jet device. Besides, a device such as a dispenser type droplet discharge device can be used.

According to yet another aspect of the invention, a resist composition contains polyvinyl alcohol and water, of which viscosity is from 5 to 20 mPa·s.

When droplet is discharged by using a device equipped with a droplet discharge means such as an ink-jet device, a viscosity of a raw material solution is preferably from 5 to 20 mPa·s. This is because a nozzle is likely to cause clogging with high viscosity and because a thickness of a formed film is thinned with low viscosity, thereby decreasing etching resistance. Note that the polyvinyl alcohol is preferably to have an average polymerization degree of 50 to 1000 in consideration of solubility in water. Polyvinyl alcohol with low polymerization degree generally has high solubility.

As the resist composition containing polyvinyl alcohol and water, of which viscosity is from 5 to 20 mPa·s, there is a resist composition containing 5 to 10 weight-percents of polyvinyl alcohol of which average polymerization degree is 500 and 90 to 95 weight-percents of water.

According to further another aspect of the invention, a method for manufacturing a semiconductor device includes a step of removing by water the protective film formed by discharging the resist composition of the invention by using a drawing means after using it. In other words, the method for manufacturing a semiconductor device comprising the steps of forming a protective film by discharging a resist composition by using a drawing means, and removing the protective film by water.

Here, the term of "after using" refers to, for example, after using it as a mask of an etching step or after using it as a mask in a step of adding impurities.

Hereinafter, a more specific configuration concerning the method for manufacturing the semiconductor device of the invention is described.

According to still further another aspect of the invention, a method for manufacturing a semiconductor device includes the steps of forming a protective film over a subject by discharging the resist composition of the invention by using a drawing means, carrying out heat treatment of the subject over which the protective film is formed, and removing the protective film by water after etching the subject by using the protective film as a mask.

According to much further another aspect of the invention, a method for manufacturing a semiconductor device including the steps of forming a protective film over a subject by discharging the resist composition of the invention by using a drawing means, carrying out heat treatment of the subject over which the protective film is formed, and removing the protective film by water after adding impurities into the subject by using the protective film as a mask.

In the above method for manufacturing the semiconductor device, heat treatment may be carried out under low pressure. Accordingly, a vaporized temperature of the solvent can be lowered and a temperature necessary for removing the solvent from the protective film can be made in a lower temperature.

Since the above protective film is soluble in water, the protective film that is unnecessary after etching or after doping can be removed by only using water. Therefore, the protective film can be removed without using a peeling solution and the like, which much containing a toxic material and is conventionally used, and further an advantageous effect such as improvement of safety or easiness to treat a raw material solution and effluent can be obtained.

Through the invention, the resist composition suitable for forming a film by using a drawing means can be obtained. In addition, a manufacturing step of a semiconductor device in which safety is improved, a raw material solution and effluent are easily treated, and which pays attention to an environment can be realized by using the resist composition of the invention.

DETAILED DESCRIPTION OF THE PREFERRED EMBODIMENTS

Figure 1A:
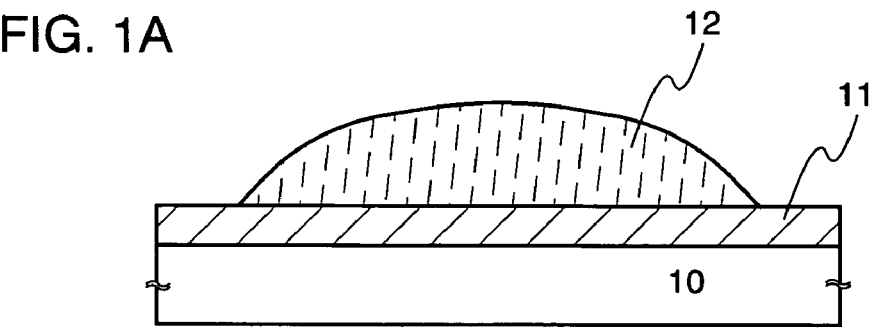
FIGS. 1A to 1D are views describing one mode of a method for manufacturing a semiconductor device of the present invention.
Figure 1B:
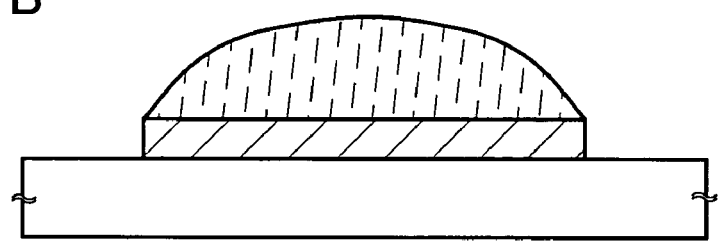
Figure 1C:
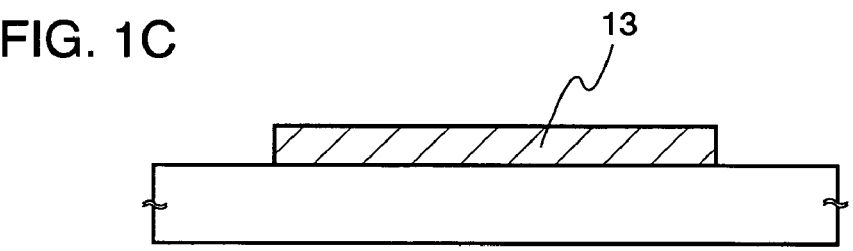
Figure 1D:
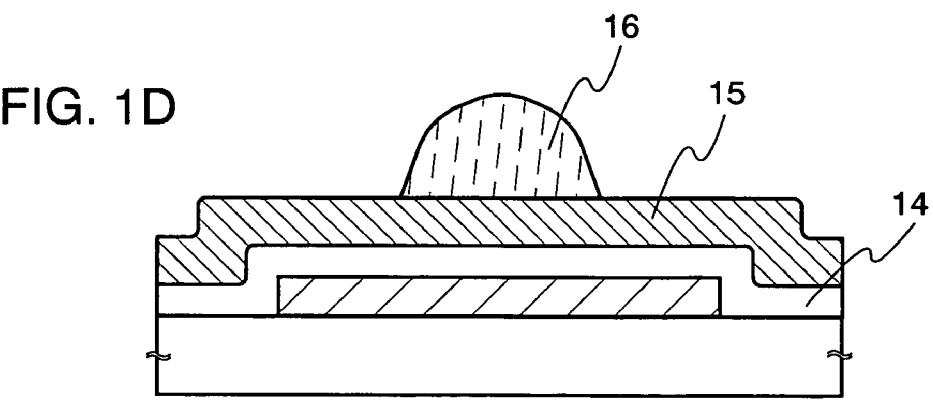
Figure 2A:
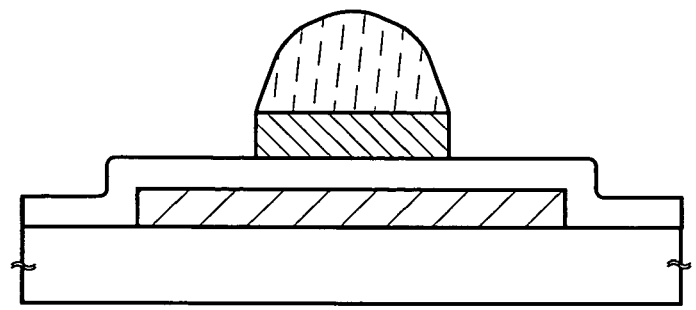
FIGS. 2A to 2D are views describing one mode of a method for manufacturing a semiconductor device of the invention.
Figure 2B:
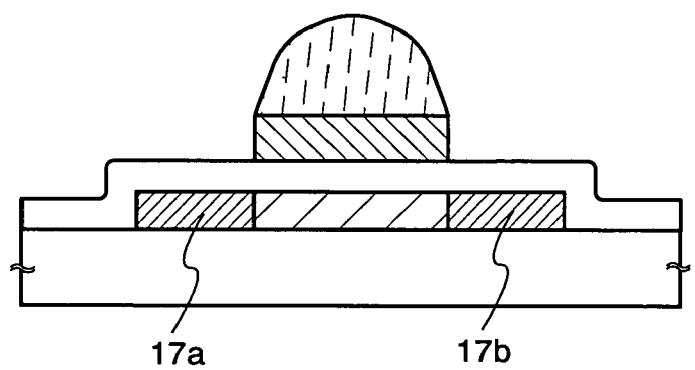
Figure 2C:
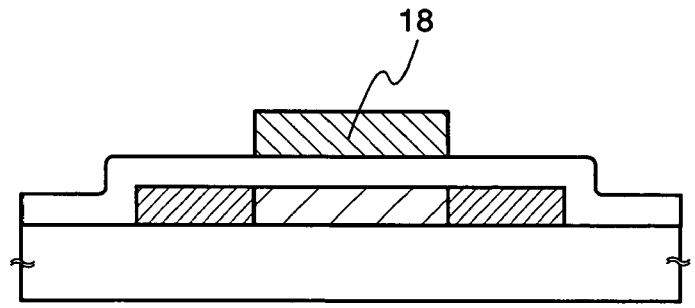
Figure 2D:
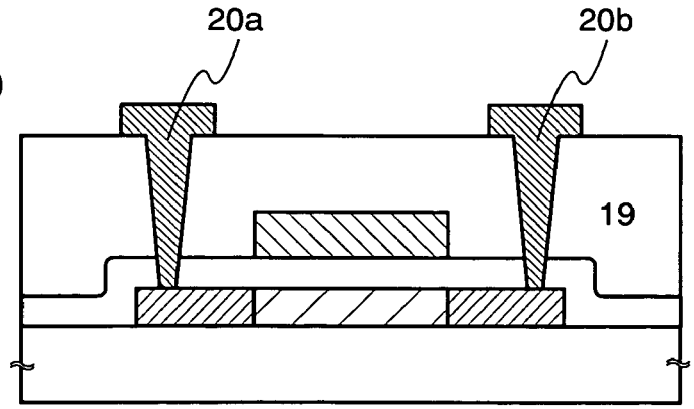

Hereinafter, one mode of the present invention will be described. However, it is to be understood that various changes and modifications will be apparent to those skilled in the art. Therefore, the invention is not interpreted with limiting to the description in Embodiment mode.

Embodiment Mode 1

A resist composition of the present invention contains water-soluble homopolymer, water, or a solvent that has compatibility with water and can dissolve the water-soluble homopolymer.

There is no specific limitation on water-soluble homopolymer; however, polyvinyl alcohol is preferable. This is because polyvinyl alcohol is a substance suitable for a protective film during dry etching in a manufacturing step of semiconductor device.

Water can be easily obtained and is a substance with high chemical stability without toxicity; therefore, it is preferable to use for the solvent.

In addition, there is no specific limitation on a solvent that has compatibility with water and can dissolve the water-soluble homopolymer, and there are N,N-dimethylformamide (DMF), dimethyl sulfoxide (DMSO), glycerol, hexamethylphosphorous triamide (HMPT), hexamethyl phosphoramide (HMPA), piperazine, triethylenediamine, and the like. In addition, a mixed solvent containing at least two substances selected from water, DMF, DMSO, glycerol, HMPT, HMPA, piperazine, and triethylenediamine can be used also as the solvent.

In addition, as preferable mode of the invention, there is a resist composition containing polyvinyl alcohol and water, of which viscosity is from 5 to 20 mPa·s. Accordingly, it gets easier to form a mask composed of the resist composition of the invention by using a device equipped with a droplet discharge means such as an ink-jet method.

As mode of the resist composition containing polyvinyl alcohol and water, of which viscosity is from 5 to 20 mPa·s, there is a resist composition containing of 5 to 10 weight-percents of polyvinyl alcohol of which average polymerization degree is 500 and 90 to 95 weight-percents of water.

The resist composition of the invention is suitable for a material to form a protective film by using a drawing means such as an ink-jet method.

The above resist composition of the invention does not contain a photosensitive compound and does not show a polymerization reaction by light. That is, it is non-photosensitive and soluble in water. Therefore, a protective film formed by using the resist composition of the invention can be removed by water.

Embodiment Mode 2

A resist composition of the present invention can be used in various processing steps of a manufacturing step of a semiconductor device. For example, a protective film which is formed by discharging a resist composition of the invention by using a drawing means can be used as a mask in an etching step or a mask in a step of adding impurities.

As one mode of a manufacturing step of a semiconductor device using the resist composition of the invention, a manufacturing step of a thin film transistor (TFT) is described with reference to FIGS. 1A to 1D and FIGS. 2A to 2D.

After forming a semiconductor film 11 on a substrate 10, a droplet made of the resist composition of the invention is discharged by using a drawing means and then a protective film 12 is formed on the semiconductor film 11. The protective film 12 is drawn with a drawing means to have a desired shape. Thus, a treatment step such as light-exposure or development is not needed and a material concerning such steps is not needed either.

Here, as the substrate 10, any one of a glass substrate, a quartz substrate, a plastic substrate, and the like may be used as long as it functions as a supporting substrate to support a semiconductor device. In addition, as the semiconductor film 11, a silicon film or the like can be used. Note that a silicon film may be either a crystalline or a non-crystalline one, or may be an amorphous film containing a microcrystalline constituent. The resist composition contains water-soluble homopolymer, water, or a solvent that has compatibility with water and can dissolve the water-soluble homopolymer. Polyvinyl alcohol or the like is preferable as the water-soluble homopolymer; however, other polyvinyl alcohol can be used also. In addition, as the solvent that has compatibility with water and can dissolve the water-soluble homopolymer, a mixed solvent containing at least one or two substances selected from water, DMF, DMSO, glycerol, HMPT, HMPA, piperazine, and triethylenediamine can be used also.

Next, the solvent contained in the protective film 12 is removed by carrying out heat treatment. Here, a heating temperature is preferable to be less than 150° C., more preferably 120° C. or less so that removal of the protective film 12 by water is easily carried out in the following step. Note that heat treatment may be carried out under low pressure. A vaporization temperature of a solvent can be lowered and a temperature necessary for removing the solvent from the protective film can be made in a lower temperature by carrying out heat treatment under low pressure.

Then, the semiconductor film 11 is etched by using the protective film 12 as a mask, thereby forming a semiconductor film 13 processed to have a desired shape.

Subsequently, the protective film 12 left on the semiconductor film 13 is dissolved to remove by water. Thus, water is used as a peeling solution in a method for manufacturing a semiconductor device of the invention. Therefore, the protective film 12 can be removed from water, which is different from a peeling solution containing a large amount of toxic substance which is conventionally used to remove a resist film, and thus extremely less pollution can be realized and a raw material cost can be controlled. This is because water-soluble homopolymer is used for the resist composition of the invention.

Next, a gate insulating film 14 is formed on the semiconductor film 13, and further a conductive film 15 is formed thereon. A protective film 16 formed by using the resist composition of the invention in the same manner as mentioned above is formed on the conductive film 15.

Then, after etching the conductive film 15 by using the protective film 16 as a mask, impurities are added into the semiconductor film 13 to form high concentration impurity regions 17a and 17b. In the high concentration impurity regions, one functions as a source of a TFT and the other functions as a drain of the TFT. In addition, a region sandwiched between the high concentration impurity regions 17a and 17b functions as a channel formation region, and the conductive film 15 after being processed functions as a gate electrode 18.

Subsequently, the protective film 16 is removed by water in the same manner as mentioned above. In addition, an interlayer insulating film 19 and a contact hole reaching to the high concentration impurity regions 17a and 17b by penetrating through the interlayer insulating film 19 are formed. Furthermore, wirings 20a and 20b for transmitting a signal to the high concentration impurity regions 17a and 17b are formed.

As mentioned above, a TFT is manufactured by applying the method for manufacturing the semiconductor device of the invention. A stagger type TFT is manufactured in this embodiment mode; however, a reverse stagger type TFT may be formed besides. In addition, a gate electrode structure is not limited to a single gate type and a multi gate type may be used. Note that a kind of impurities to be added may be appropriately changed depending on which TFT to manufacture, for example, an n-channel type TFT or a p-channel type TFT.

As mentioned above, a manufacturing step of a TFT to which the method for manufacturing the semiconductor device of the invention is applied, the protective film used as a mask in an etching step or a step of adding impurities can be removed only by water. That is, the method for manufacturing the semiconductor device of the invention is a method in which a substance with high safety is used and that is easily treated as a peeling solution, and which pays attention to an environment. Note that such method for manufacturing the semiconductor device is realized by using the resist composition of the invention.

Embodiment Mode 3

As one mode of a manufacturing step of a semiconductor device using a resist composition of the present invention, a manufacturing step of a bottom gate type thin film transistor (TFT) is described with reference to FIGS. 5A to 5D and FIGS. 6A to 6C.

After forming a conductive film 31 on a substrate 30, a droplet made of the resist composition of the invention is discharged by using a drawing means to form a protective film 32 on the conductive film 31 in the same manner as Embodiment Mode 2.

Next, the conductive film 31 is etched by using the protective film 32 as a mask, thereby forming a gate electrode 33. After forming the gate electrode 33, the protective film 32 is removed by treating with water.

Then, a gate insulating film 34 is formed on the gate electrode 33 and further a semiconductor film 35 and a semiconductor film 36 containing an n-type impurity are sequentially formed over the gate insulating film 34. Thereafter, a conductive film 37 is formed on the semiconductor film 36.

Subsequently, a droplet made of the resist composition of the invention is discharged by using a drawing means, thereby forming a protective film 38 in the same manner as Embodiment Mode 2.

Next, after etching the conductive film 37 by using the protective film 38 as a mask, the semiconductor film 36 is etched. Accordingly, an electrode 39, containing an n-type impurity, that functions as a source electrode or a drain electrode of a TFT is formed. In addition, a wiring 40 is formed on the electrode 39. After forming the electrode 39 and the wiring 40, the protective film 38 is removed by treating with water. Note that the semiconductor film 35 may be partly etched along with the etching of the semiconductor film 36.

Through such steps, specifically a TFT to be referred to as a channel etch type can be manufactured among a bottom gate type TFT.

Embodiment 1

A manufacturing example of a resist composition of the present invention is described.

Five kinds of composition having different composition ratio, in which polyvinyl alcohol and water are contained are manufactured and viscosity thereof is examined. Note that polyvinyl alcohol having an average polymerization degree of 500 is used in this embodiment. An evaluation result is shown in Table 1. Embodiment 1-1 shows a composition containing 1.0 weight-percents of polyvinyl alcohol and 99.0 weight-percents of water. Embodiment 1-2 shows a composition containing 2.5 weight-percents of polyvinyl alcohol and 97.5 weight-percents of water. Embodiment 1-3 shows a composition containing 5.0 weight-percents of polyvinyl alcohol and 95.0 weight-percents of water. Embodiment 1-4 shows a composition containing 7.5 weight-percents of polyvinyl alcohol and 92.5 weight-percents of water. Embodiment 1-5 shows a composition containing 10.0 weight-percents of polyvinyl alcohol and 90.0 weight-percents of water. Note that the polyvinyl alcohol used in this embodiment has an average polymerization degree of 500, a saponification degree of 86.5 to 89 mol %, which is made by Kishida Chemical Co., ltd.

Furthermore, etching resistance and a peeling property of a film formed by using the composition shown in Embodiments 1-1 to 1-5 is also evaluated in this embodiment.

Etching resistance is evaluated as following. First, a film is formed over a silicon film by using the composition shown in Embodiments 1-1 to 1-5 and heated at 120° C., and then exposed to an atmosphere in which plasma is generated in an atmosphere containing oxygen and carbon tetrafluoride for about 155 seconds, thereby etching the silicon film. After etching, it is evaluated whether the silicon film is processed to have a desired shape, and when the silicon film is processed to have a desired shape, it is regarded to have etching resistance.

In addition, the peeling property is evaluated as following. After forming and heating a film over a silicon film by using the composition shown in Embodiments 1-1 to 1-5, it is evaluated whether the film can be peeled by water. A heating temperature is evaluated under three conditions of 100° C., 120° C., and 150° C. in consideration of a vaporization temperature (under an atmospheric pressure) of water contained in the composition. Note that a heating time is 10 minutes.

TABLE 1

|  | Evaluation1 Viscosity | Evaluation2 Etching | Evaluation3 Peeling Property (Every Heating Temperature) | | |
| --- | --- | --- | --- | --- | --- |
|  | (mPa · s) | Resistance | 100° C. | 120° C. | 150° C. |
| Embodiment 1-1 | 1.3 | x | ○ | ○ | x |
| Embodiment 1-2 | 2.5 | x | ○ | ○ | x |
| Embodiment 1-3 | 7.0 | ○ | ○ | ○ | x |
| Embodiment 1-4 | 15.0 | ○ | ○ | ○ | x |
| Embodiment 1-5 | 20.0 | ○ | ○ | ○ | x |

According to the above results, it can be understood that the composition shown in Embodiments 1-3, 1-4, and 1-5 has viscosity of from 5 to 20 mPa·s suitable for a composition of a device equipped with a droplet discharge means such as an ink-jet device. Here, the viscosity is measured by using a vibration-type viscometer (model number VM-1G-L, made by CBC Materials Co., Ltd.) in the atmosphere kept to be 23° C. In addition, the composition shown in Examples 1-3, 1-4, and 1-5 is also satisfactory in respect of etching resistance. Furthermore, in respect of a peeling property, it differs in every heating temperature and it can be understood that a film formed by using the above composition as a raw material is difficult to be removed by using water at a temperature of 150° C. or more. Therefore, a heating temperature of after forming the film is preferably less than 150° C. and more preferably 120° C. or less. Note that there is no specific difference in each composition ratio in respect of a peeling property.

Embodiment 2

In this embodiment, a display device using a TFT array substrate manufactured by applying a method for manufacturing a semiconductor device of the present invention is described with reference to FIGS. 3A and 3B.

Figure 3A:
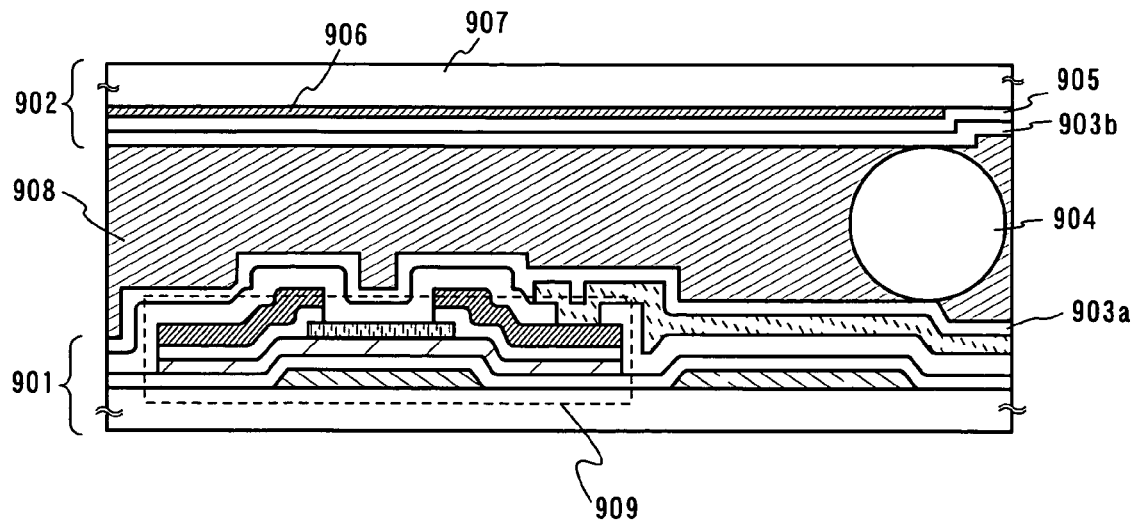
FIGS. 3A and 3B are views describing a display device manufactured according to the invention.

FIG. 3A is a cross-sectional view of a liquid crystal display device, which includes a TFT array substrate 901 manufactured by applying the method for manufacturing the semiconductor device of the invention, an opposite substrate 902, and a liquid crystal layer 908 sandwiched between the substrates. Note that an alignment film 903a is formed over the TFT array substrate 901. In the opposite substrate 902, a light shielding film 906 to prevent a TFT from being irradiated with light, a counter electrode 905, and an alignment film 903b are formed over a substrate 907. Rubbing treatment is carried out to the alignment films 903a and 903b respectively. Note that the TFT array substrate 901 and the opposite substrate 902 are attached to each other with a sealant and the liquid crystal material is filled therein. In addition, if necessary, a color filter or the like, which is not shown in FIG. 3A, may be provided to obtain a full-color liquid crystal display device. Note that 904 is a spacer.

In respect of injecting the liquid crystal material, a method for injecting the liquid crystal material after attaching the TFT array substrate and the opposite substrate to each other may be adopted. Alternatively, a method for attaching the both substrates after dropping the liquid crystal material over either substrate of the TFT array substrate or the opposite substrate may be adopted.

Figure 3B:
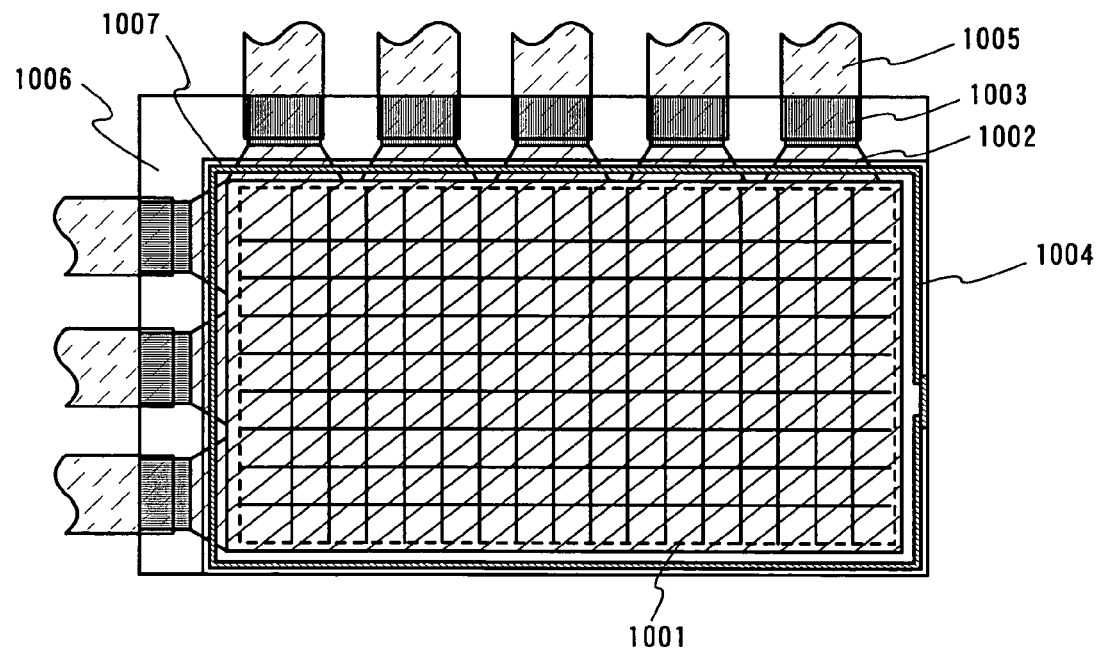

FIG. 3B is a top view of the device shown in FIG. 3A. Connection wirings 1002 are provided adjacent to a pixel portion 1001 and connected with an external I/O terminal 1003 by the connection wirings 1002. In the pixel portion 1001, a pixel is formed by intersecting the wirings extended from the connection wirings 1002 in matrix. A sealant 1004 is formed outside of the pixel portion 1001 over a TFT array substrate 1006 and inside of the external I/O terminal 1003. In the liquid crystal display device, a flexible printed wiring board 1005 (FPC: flexible printed circuit) is connected with the external I/O terminal 1003 and connected to each signal line by the connection wirings 1002. The external I/O terminal 1003 is formed of the same conductive film as the connection wirings. The flexible printed wiring board 1005 has a copper wiring over an organic resin film such as polyimide and is connected with the external I/O terminal 1003 by an anisotropic conductive adhesive. Note that reference numeral 1007 denotes an opposite substrate.

Figure 7:
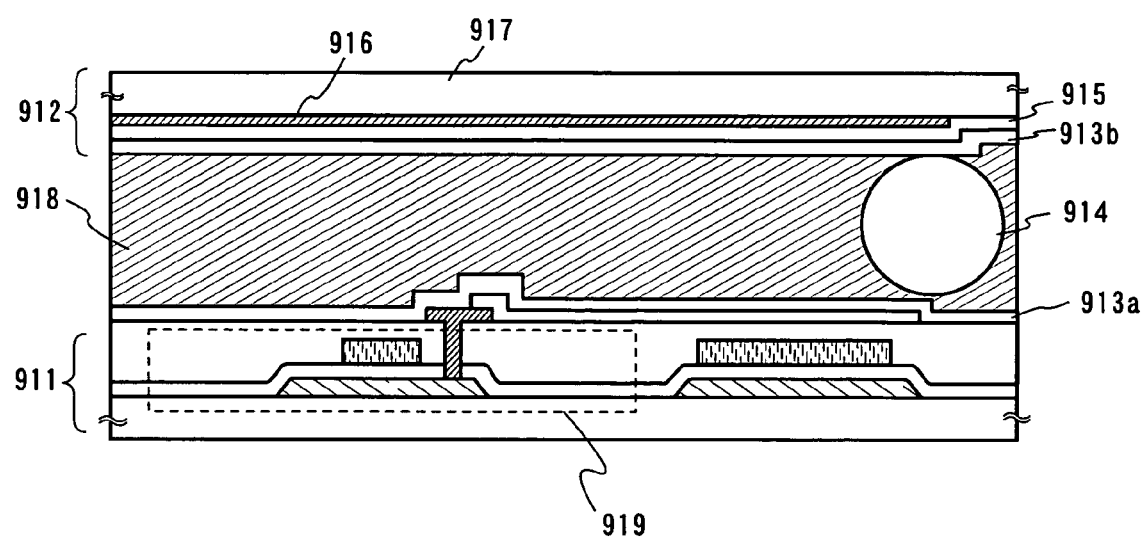
FIG. 7 is a view describing a display device manufactured according to the invention.

In addition, the method for manufacturing the liquid crystal display device is described in this embodiment. However, it is not limited thereto but also an electroluminescence display devices or the like may be manufactured by using the TFT array substrate manufactured by applying the method for manufacturing the semiconductor device of the invention. In addition, a reverse stagger type TFT 909 is shown in FIG. 3A. Besides, a liquid crystal display device including a top gate type TFT 919 or the like as shown in FIG. 7 may be manufactured, or alternatively not only the channel protective type TFT as shown in FIG. 3A but also the channel etch type TFT as described with reference to FIGS. 5A to 5D and FIGS. 6A to 6C may be employed. FIG. 7 includes a TFT array substrate 911 manufactured by applying the method for manufacturing the semiconductor device of the invention, an opposite substrate 912, and a liquid crystal layer 918 sandwiched between the substrates. Note that an alignment film 913a is formed over the TFT array substrate 911. In the opposite substrate 912, a light shielding film 916 to prevent a TFT from being irradiated with light, a counter electrode 915, and an alignment film 913b are formed over a substrate 917. Rubbing treatment is carried out to the alignment films 913a and 913b respectively. Note that the TFT array substrate 911 and the opposite substrate 912 are attached to each other with a sealant and the liquid crystal material is filled therein. In addition, if necessary, a color filter or the like, which is not shown in FIG. 7, may be provided to obtain a full-color liquid crystal display device. Note that 914 is a spacer.

The above liquid crystal display device or the electroluminescence display device is manufactured by applying the method for manufacturing the semiconductor device of the invention specifically in the manufacturing step of the TFT array substrate and can be manufactured by using a resist composition of the invention.

Embodiment 3

An electronic device to which the present invention is applied is described with reference to FIGS. 4A to 4F in this embodiment. The electronic device as shown in FIGS. 4A to 4F can be manufactured in the step with high safety by applying the invention.

Figure 4A:
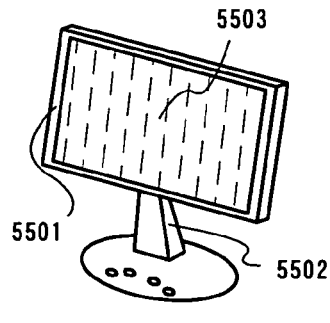
FIGS. 4A to 4F are views describing an electronic device manufactured according to the invention.

FIG. 4A is a display device, which includes a casing 5501, a support 5502, and a display portion 5503. It can be manufactured by incorporating a liquid crystal display device shown in Embodiment 2.

Figure 4B:
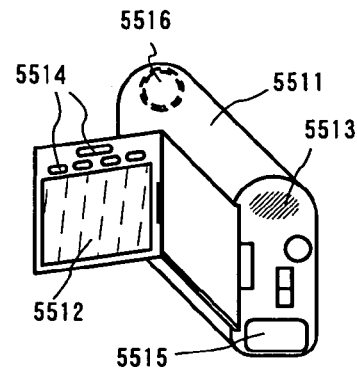

FIG. 4B is a video camera, which includes a main body 5511, a display portion 5512, audio input portion 5513, operation switches 5514, a battery 5515, an image receiving portion 5516, and the like. A display device can be completed by incorporating the liquid crystal display device shown in Embodiment 2 into the video camera.

Figure 4C:
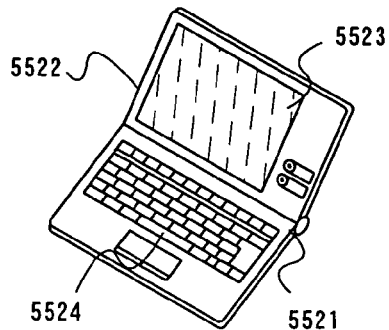

FIG. 4C is a laptop computer manufactured by applying the invention, which includes a main body 5521, a casing 5522, a display portion 5523, a keyboard 5524, and the like. A display device can be completed by incorporating the liquid crystal display device shown in Embodiment 2 into the laptop computer.

Figure 4D:
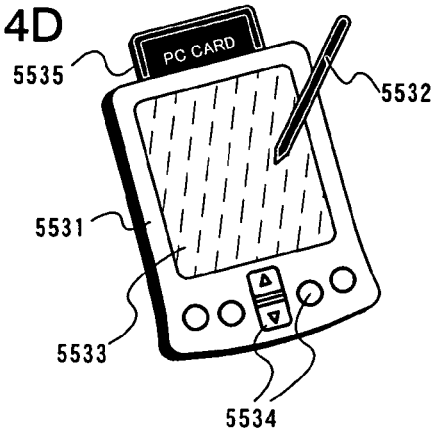

FIG. 4D is a personal digital assistant (PDA) manufactured by applying the invention, which includes a display portion 5533, an external interface 5535, operation buttons 5534, and the like in a main body 5531. In addition, there is a stylus 5532 as an operating accessory. A display device can be completed by incorporating the liquid crystal display device shown in Embodiment 2 into the personal digital assistant (PDA).

Figure 4E:
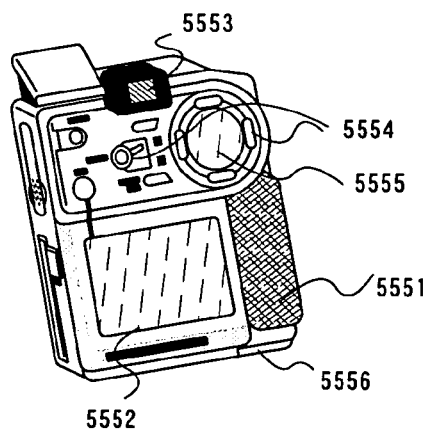

FIG. 4E is a digital video camera, which includes a main body 5551, a display portion (A) 5552, an eye piece portion 5553, operation switches 5554, a display portion (B) 5555, a battery 5556, and the like. A display device can be completed by incorporating the liquid crystal display device shown in Embodiment 2 into the digital video camera.

Figure 4F:
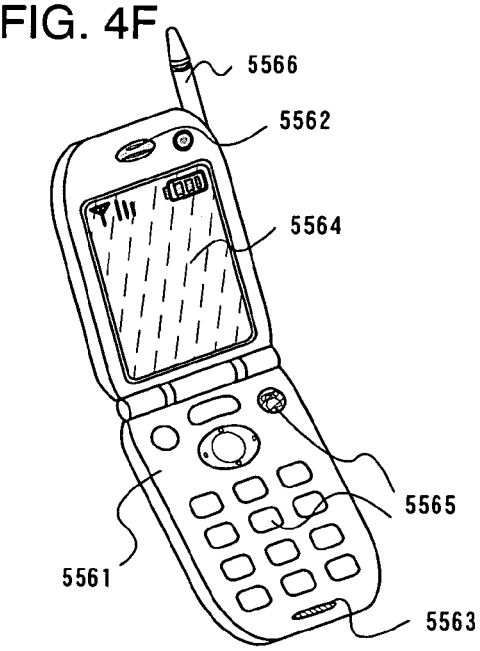
Figure 5A:
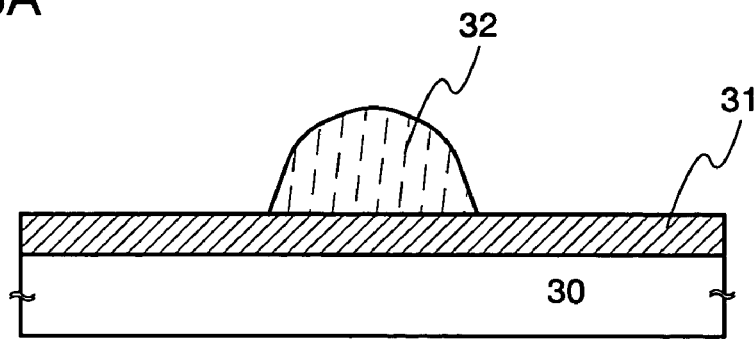
FIGS. 5A to 5D are views describing one mode of a method for manufacturing a semiconductor device of the invention.
Figure 5B:
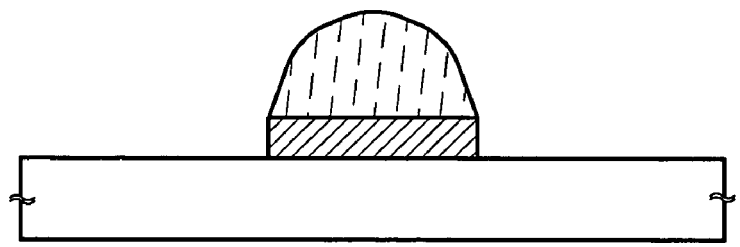
Figure 5C:
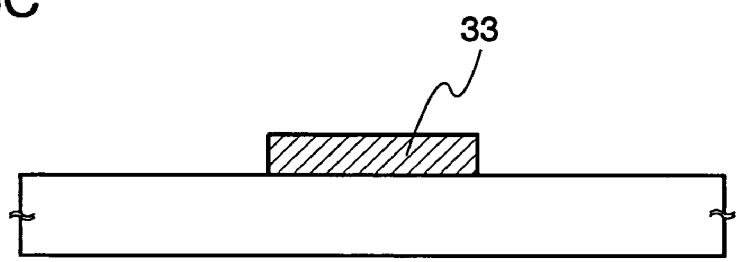
Figure 5D:
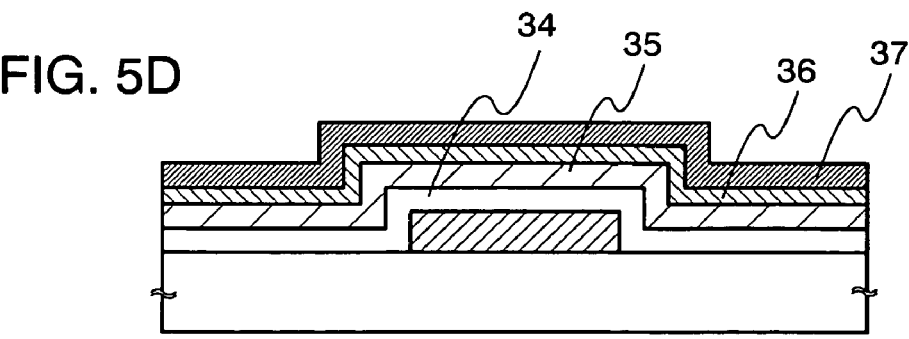
Figure 6A:
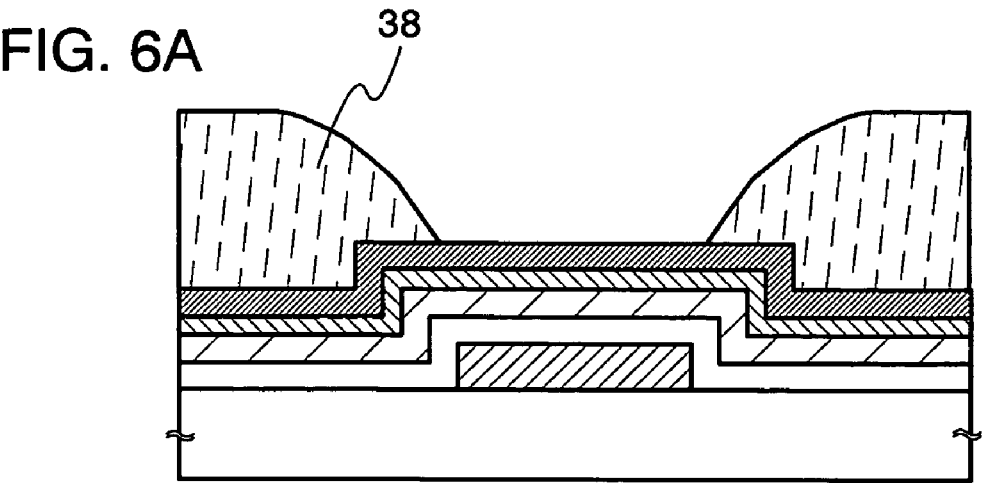
FIGS. 6A to 6C are views describing one mode of a method for manufacturing a semiconductor device of the invention.
Figure 6B:
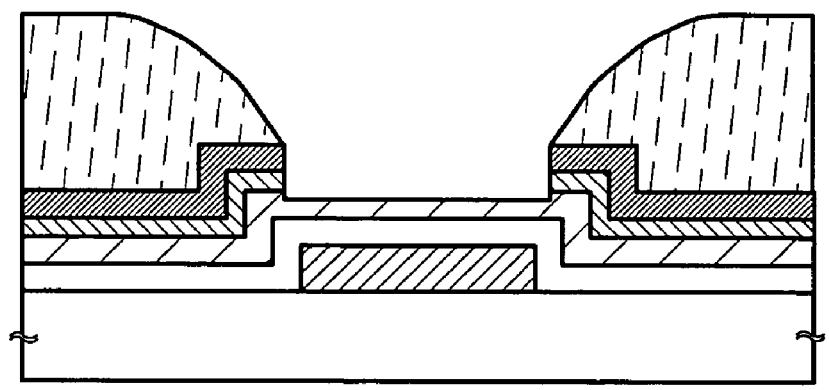
Figure 6C:
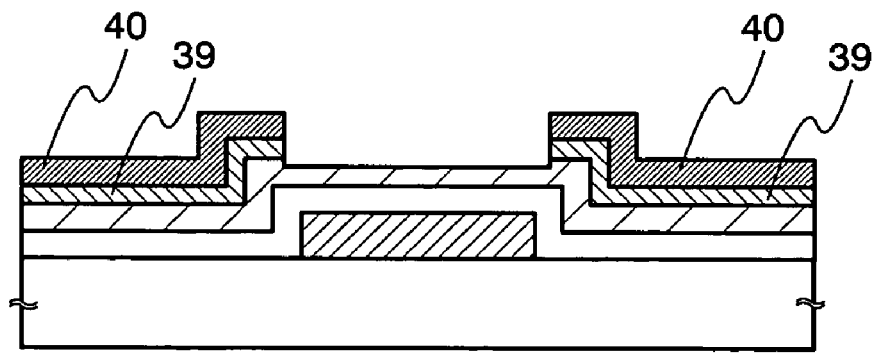

FIG. 4F is a cellular phone manufactured by applying the invention. A display portion 5564, an audio output portion 5562, an audio input portion 5563, operation switches 5565, an antenna 5566, and the like are provided for a main body 5561. A display device can be completed by incorporating the liquid crystal display device shown in Embodiment 2 into the cellular phone.

This application is based on Japanese Patent Application serial no. 2003-293660 filed in Japanese Patent Office on Aug. 15 in 2003, the contents of which are hereby incorporated by reference.

What is claimed is:

1. A method for manufacturing a semiconductor device comprising the steps of:
   discharging a resist composition by using a drawing means to form a resist pattern; and
   removing the resist pattern by water,
   wherein the resist composition is non-photosensitive and comprises polyvinyl alcohol and water, and
   wherein a viscosity of the resist composition is from 5 to 20 mPa·s.

2. The method for manufacturing a semiconductor device according to claim 1, wherein the discharging is performed by an ink-jet method.

3. The method for manufacturing a semiconductor device according to claim 1, wherein the subject is a semiconductor film or a conductive film.

4. A method for manufacturing a semiconductor device comprising the steps of:
   discharging a resist composition by using a drawing means to form a resist pattern; and
   removing resist pattern by water,
   wherein the resist composition is non-photosensitive and comprises polyvinyl alcohol and water,
   wherein a viscosity of the resist composition is from 5 to 20 mPa·s, and
   wherein the polyvinyl alcohol has an average polymerization degree of 50 to 1000.

5. The method for manufacturing a semiconductor device according to claim 4, wherein the discharging is performed by an ink-jet method.

6. The method for manufacturing a semiconductor device according to claim 4, wherein the subject is a semiconductor film or a conductive film.

7. A method for manufacturing a semiconductor device comprising the steps of:
   discharging a resist composition by using a drawing means to form a resist pattern;
   carrying out heat treatment of a subject over which the resist pattern is formed;
   etching the subject by using the resist pattern as a mask; and
   removing the resist pattern by water,
   wherein the resist composition is non-photosensitive and comprises polyvinyl alcohol and water, and
   wherein a viscosity of the resist composition is from 5 to 20 mPa·s.

8. The method for manufacturing a semiconductor device according to claim 7, wherein the heat treatment is carried out under low pressure.

9. The method for manufacturing a semiconductor device according to claim 7, wherein the discharging is performed by an ink-jet method.

10. The method for manufacturing a semiconductor device according to claim 7, wherein the subject is a semiconductor film or a conductive film.

11. A method for manufacturing a semiconductor device comprising the steps of:
    discharging a resist composition by using a drawing means to form a resist pattern;
    carrying out heat treatment of a subject over which the resist pattern is formed;
    etching the subject by using the resist pattern as a mask; and
    removing the resist pattern by water,
    wherein the resist composition is non-photosensitive and comprises polyvinyl alcohol and water,
    wherein a viscosity of the resist composition is from 5 to 20 mPa·s, and
    wherein the polyvinyl alcohol has an average polymerization degree of 50 to 1000.

12. The method for manufacturing a semiconductor device according to claim 11, wherein the heat treatment is carried out under low pressure.

13. The method for manufacturing a semiconductor device according to claim 11, wherein the discharging is performed by an ink-jet method.

14. The method for manufacturing a semiconductor device according to claim 11, wherein the subject is a semiconductor film or a conductive film.

15. A method for manufacturing a semiconductor device comprising the steps of:
    discharging a resist composition by using a drawing means to form a resist pattern;
    carrying out heat treatment of a subject over which the resist pattern is formed;
    adding impurities into the subject by using the resist pattern as a mask; and
    removing the resist pattern by water, wherein the resist composition is non-photosensitive and comprises water-soluble homopolymer and a solvent which has compatibility with water.

16. The method for manufacturing a semiconductor device according to claim 15, wherein the heat treatment is carried out under low pressure.

17. The method for manufacturing a semiconductor device according to claim 15, wherein the discharging is performed by an ink-jet method.

18. The method for manufacturing a semiconductor device according to claim 15, wherein the subject is a semiconductor film.

19. A method for manufacturing a semiconductor device comprising the steps of:
  discharging a resist composition by using a drawing means to form a resist pattern;
  carrying out heat treatment of a subject over which the resist pattern is formed;
  adding impurities into the subject by using the resist pattern as a mask; and
  removing the resist pattern by water,
  wherein the resist composition is non-photosensitive and comprises polyvinyl alcohol and at least one kind of a solvent selected from the group consisting of water, N,N-dimethylformamide, dimethyl sulfoxide, glycerol, hexamethylphosphorous triamide, hexamethyl phosphoramide, piperazine, and triethylenediamine.

20. The method for manufacturing a semiconductor device according to claim 19, wherein the heat treatment is carried out under low pressure.

21. The method for manufacturing a semiconductor device according to claim 19, wherein the discharging is performed by an ink-jet method.

22. The method for manufacturing a semiconductor device according to claim 19, wherein the subject is a semiconductor film.

23. A method for manufacturing a semiconductor device comprising the steps of:
  discharging a resist composition by using a drawing means to form a resist pattern;
  carrying out heat treatment of a subject over which the resist pattern is formed;
  adding impurities into the subject by using the resist pattern as a mask; and
  removing the resist pattern by water,
  wherein the resist composition is non-photosensitive and comprises polyvinyl alcohol and water, and
  wherein a viscosity of the resist composition is from 5 to 20 mPa·s.

24. The method for manufacturing a semiconductor device according to claim 23, wherein the heat treatment is carried out under low pressure.

25. The method for manufacturing a semiconductor device according to claim 23, wherein the discharging is performed by an ink-jet method.

26. The method for manufacturing a semiconductor device according to claim 23, wherein the subject is a semiconductor film.

27. A method for manufacturing a semiconductor device comprising the steps of:
  discharging a resist composition by using a drawing means to form a resist pattern;
  carrying out heat treatment of a subject over which the resist pattern is formed;
  adding impurities into the subject by using the resist pattern as a mask; and
  removing the resist pattern by water,
  wherein the resist composition is non-photosensitive and comprises polyvinyl alcohol and water,
  wherein a viscosity of the resist composition is from 5 to 20 mPa·s, and
  wherein the polyvinyl alcohol has an average polymerization degree of 50 to 1000.

28. The method for manufacturing a semiconductor device according to claim 27, wherein the heat treatment is carried out under low pressure.

29. The method for manufacturing a semiconductor device according to claim 27, wherein the discharging is performed by an ink-jet method.

30. The method for manufacturing a semiconductor device according to claim 27, wherein the subject is a semiconductor film.

* * * * *